US006848046B2

(12) United States Patent
Zimmer

(10) Patent No.: US 6,848,046 B2
(45) Date of Patent: Jan. 25, 2005

(54) SMM LOADER AND EXECUTION MECHANISM FOR COMPONENT SOFTWARE FOR MULTIPLE ARCHITECTURES

(75) Inventor: Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 09/854,174

(22) Filed: May 11, 2001

(65) Prior Publication Data

US 2002/0169951 A1 Nov. 14, 2002

(51) Int. Cl.[7] .............................................. G06F 13/00
(52) U.S. Cl. ...................... 713/100; 713/320; 710/18; 710/261; 710/266
(58) Field of Search ............................... 713/100, 320; 710/18, 261, 266

(56) References Cited

U.S. PATENT DOCUMENTS

| 5,109,329 | A | * | 4/1992 | Strelioff | 710/261 |
|---|---|---|---|---|---|
| 5,671,422 | A | * | 9/1997 | Datta | 710/261 |
| 5,737,579 | A | * | 4/1998 | Kimura et al. | 703/26 |
| 6,193,422 | B1 | * | 2/2001 | Belt et al. | 713/320 |
| 6,453,278 | B1 | * | 9/2002 | Favor et al. | 703/27 |

FOREIGN PATENT DOCUMENTS

| DE | 199 46 959 A1 | 4/2001 |
|---|---|---|
| EP | 0 924 610 A2 | 6/1999 |
| EP | 0 924 610 A3 | 6/1999 |
| WO | PCT/US 02/14776 | 9/2002 |

OTHER PUBLICATIONS

Intel Corporation: "IA–64 System Abstraction Layer Sepcification" On Line Manual, Jan. 2000, XP002253057.
Intel Corporation: "Intel Architecture Software Developer's Manual–Chapter 11" On Line Manual, Jan. 2000, Jul. 2000 XP002253058.
Intel Corporation: "Extensible Firmware Interface Specification–version 1.02 Chapters 1, 16, 17" On Line Specification, Dec. 12, 2000, XP002253059.

* cited by examiner

Primary Examiner—Rehana Perveen
(74) Attorney, Agent, or Firm—Blakely, Sokoloff, Taylor & Zafman LLP

(57) ABSTRACT

A method and system that enables executable content in the form of one or more software drivers or firmware volumes to be loaded into the System Management Mode (SMM) of a microprocessor or the native mode of an Itanium-based processor. The mechanism allows for multiple drivers, possibly written by different parties, to be installed for these operations. An agent that registers event handlers provided by the drivers runs in the EFI boot-services mode and is composed of a CPU-specific component that binds the drivers and a platform component that abstracts chipset control of the xMI (PMI or SMI) signals corresponding to an event triggering condition. Accordingly, the functionality of the SMM mode of various processors and the native mode of Itanium processors can be extended through add-on drivers written by parties other than the OEM from the computer system or the BIOS vendor for the system.

26 Claims, 8 Drawing Sheets

SMM LOADER AND EXECUTION MECHANISM FOR COMPONENT SOFTWARE FOR MULTIPLE ARCHITECTURES

BACKGROUND OF THE INVENTION

1. Field of the Invention

The present invention concerns computer systems in general, and a mechanism for extending the functionality of the System Management Mode (SMM) and other similar modes of processors in particular.

2. Background Information

Since the 386SL processor was introduced by the Intel Corporation, SMM has been available on IA32 processors as an operation mode hidden to operating systems that executes code loaded by BIOS or firmware. SMM is a special-purpose operating mode provided for handling system-wide functions like power management, system hardware control, or proprietary OEM-designed code. The mode is deemed "hidden" because the operating system (OS) and software applications cannot see it, or even access it.

IA32 processors are enabled to enter SMM via activation of an SMI (System Management Interrupt) signal. A similar signal called the PMI (Processor Management Interrupt) signal that is roughly analogous to the SMI signal is used for Itanium™-class processors. For simplicity, both SMI and PMI signals are sometimes referred to as xMI signals herein.

To date, most BIOS implementations that leverage the SMM capability of the foregoing Intel processors simply register a monolithic section of code that is created during the build of the BIOS to support a specific function or set of functions particular to systems that use the BIOS. This code comprises 16-bit assembly in IA32 and 64-bit assembly for Itanium processors. The monolithic code segments for these legacy implementations runs from beginning to completion in response to all xMI activations.

There is no provision in today's systems for the registration or execution of third-party SMM code, thus allowing no extensibility to the SMM framework. Such extensibility is often desired. For example, if the functions provided by the SMM code provided by the original equipment manufacturer (OEM) or the BIOS vendor for a given platform is insufficient, a developer or value-added reseller (VAR) has to either license the existing code from the BIOS vendor or OEM and attempt to graft their own logic into their implementation of SMM code, or live with the insufficiency, since the present SMM framework does not provide an alternative way to modify or extend the functions provided by the monolithic code segment. In addition, today's implementations on IA32 processors are restricted to the 16-bit mode of the processor, thus limiting the size of the code and the possible leveraging of 32-bit or 64-bit software engineering techniques. Also, in that SMM is often used for chipset workarounds (e.g., CPU or chipset errata that produces an erroneous and/or unpredictable result due to a design or manufacturing flaw in the chipset or CPU), the ability to get this key software update is gated by the monolithic BIOS implementation of the BIOS vendor or OEM.

In today's environment, most chipset vendors opt for having the operating system vendor integrate such workarounds using an OS-driver. In general, BIOS updates for SMM functions are problematic to effect and since the OS already has a hardware extensibility mechanism via its own driver model, BIOS vendors and OEMs are less motivated to provide these types of BIOS updates.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

Figure 1:
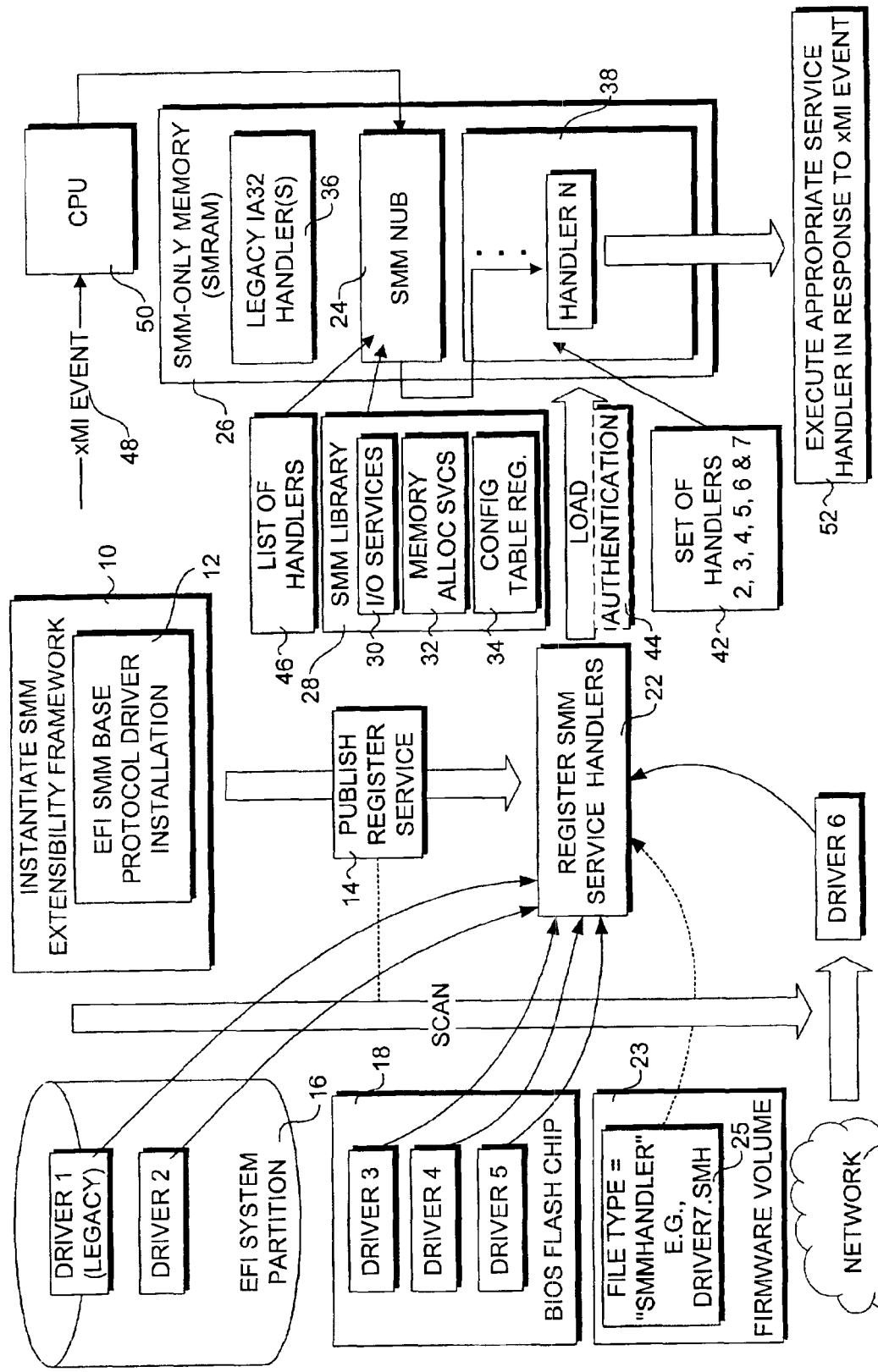
FIG. 1 is a schematic diagram illustrating an exemplary implementation of the present invention that enables various event handlers to be loaded into a hidden memory space and executed in response to a SMI or PMI (xMI) event.

In the following description, numerous specific details are provided to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention provides a mechanism that enables executable content in the form of one or more software drivers to be loaded into the System Management Mode (SMM) of an Intel 32-bit family of microprocessor (i.e., IA-32 processors), or the native mode of an Itanium-based processor with a PMI signal activation. The state of execution of code in IA32 SMM is initiated by an SMI signal and that in Itanium™ processors is initiated by a PMI signal activation; for simplicity, these will generally be referred to as SMM. The mechanism allows for multiple drivers, possibly written by different parties, to be installed for SMM operation. An agent that registers the drivers runs in the EFI (Extensible Firmware Interface) boot-services mode (i.e., the mode prior to operating system launch) and is composed of a CPU-specific component that binds the drivers and a platform component that abstracts chipset control of the xMI (PMI or SMI) signals. The API's (application program interfaces) providing these sets of functionality are referred to as the SMM Base and SMM Access Protocol, respectively.

In conventional SMM implementations, SMM space is often locked by the platform software/firmware/BIOS via hardware mechanisms before handing off control; this grants firmware the ability to abstract the control and security of this binding. In contrast, the software abstraction via the SMM Access protocol provided by the invention obviates the need of users of this facility to know and understand the exact hardware mechanism, thus allowing drivers to be portable across many platforms.

As provided in further detail below, the present invention includes the following features: a library in SMM for the drivers' usage, including an I/O access abstraction and memory allocation services; a means to communicate with drivers and applications executing in non-SMM mode; an optional parameter for periodic activation at a given frequency; a means to authenticate the drivers on load into SMM; the ability to close the registration capability; the ability to run in a multi-processor environment where many processors receive the xMI activation; and finally, the capability to run legacy IA32 SMM code as a distinguished registered event handler. A characteristic of the system is that all event handlers run in the native processor mode of Itanium™ or in the case of IA32, the framework will put the processor into flat 32 mode prior to invoking the event handlers, while running the optional legacy IA32 handler(s) in real-mode (i.e., 16-bit mode).

A high-level view of an exemplary implementation of the invention is depicted in FIG. 1. The implementation is enabled through use of the EFI framework, which defines a new model for the interface between operating systems and platform firmware. The interface consists of data tables that contain platform-related information, plus boot and runtime service calls that are available to the operating system and its loader. Together, these provide a standard environment for booting an operating system and running pre-boot applications.

The process for producing the SMM extensibility framework is initiated in a block 10, wherein The SMM extensibility framework is instantiated. This includes installing an EFI SMM base protocol driver in a block 12. The EFI SMM base protocol, SMM_BASE, is a CPU-specific protocol that is published by the CPU driver or another agency that can abstract the ISA-specific details of an IA32 or Itanium processor. Once installed, SMM_BASE publishes an SMM handler register service in a block 14. Publication of the handler register service enables legacy and add-on drivers that are stored on various storage devices, including an EFI system partition 16, a BIOS flash chip 18 and on a storage device accessed via a network 20 to register SMM event handlers in a block 22. In addition to these types of storage devices, the drivers may be stored on other persistent storage devices that are accessible to the computer system in which the invention is implemented, including motherboard-based ROMs, option-ROMs contained on add-on peripheral cards, local hard disks and CD ROMs, which are collectively depicted by a firmware volume 23. (It is noted that EFI system partition 16, BIOS flash chip 18 and the remote storage device on which driver 6 resides also may comprise firmware volumes.) As depicted in FIG. 1, these drivers include a legacy driver 1 and an add-on driver 2 stored in EFI system partition 16, add-on drivers 3, 4, and 5, which are stored on BIOS flash chip 18, and an add-on driver 6 that is accessed from a remote storage device (e.g., file server) via network 20. As used herein, the term "add-on" corresponds to drivers and firmware files that were not provided with the original firmware of the computer system as provided by the original equipment manufacture (OEM) of that system.

In an optional mode, the EFI SMM base protocol driver may scan various firmware volumes to identify any drivers that are designated for servicing xMI events via SMM. In one embodiment, these drivers are identified by their file type, such as exemplified by a "DRIVER7.SMH" file 25 corresponding to an add-on driver 7.

During the installation of the EFI SMM base protocol driver, an SMM Nub 24 is loaded into SMRAM 26, which comprises an SMM-only memory space. As explained in further detail below, SMM Nub 24 is responsible for coordinating all activities while control is transferred to SMM, including providing an SMM library 28 to event handlers that includes PCI and I/O services 30, memory allocation services 32, and configuration table registration 34.

Registration of an SMM event handler is the first step in enabling the handler to perform a particular xMI event servicing function it is designed to perform. An SMM event handler comprises a set of code (i.e., coded machine instructions) that when executed by the system processor (CPU) performs an event service function in a manner similar to an interrupt service routine. Typically, each SMM event handler will contain code to service a particular hardware component or subsystem, or a particular class of hardware. For example, SMM event handlers may be provided for servicing errors cause by the system's real time clock, I/O port errors, PCI device errors, etc. In general, there may be some correspondence between a given driver and an SMM event handler. However, this is not a strict requirement, as the handlers may comprise a set of functional blocks extracted from a single driver file or object.

When the event handler for legacy driver 1 is registered, it is loaded into SMRAM 26 as a legacy handler 36. A legacy handler is an event handler that is generally provided with the original system firmware and represents the conventional mechanism for handling an xMI event. As each add-on SMM event handler is registered in block 22, it is loaded into an add-on SMM event handler portion 38 of SMRAM 26; once all of add-on event handlers are loaded, add-on SMM event handler portion 28 comprises a set of event handlers corresponding to add-on drivers 2–7, as depicted by a block 42. In addition, as each SMM event handler is registered, it may optionally be authenticated in a block 44 to ensure that the event handler is valid for use with the particular processor and/or firmware for the computer system. For example, an encryption method that implements a public key may be used. As SMM event handlers are registered, they are added to a list of handlers 46 maintained by SMM Nub 24.

Once all of the legacy and add-on SMM event handlers have been registered and loaded into SMRAM 26 and proper configuration data (metadata) is written to SMM Nub 24, the SMRAM is locked, precluding registration of additional SMM event handlers. This system is now ready to handle various xMI events via SMM.

Figure 2:
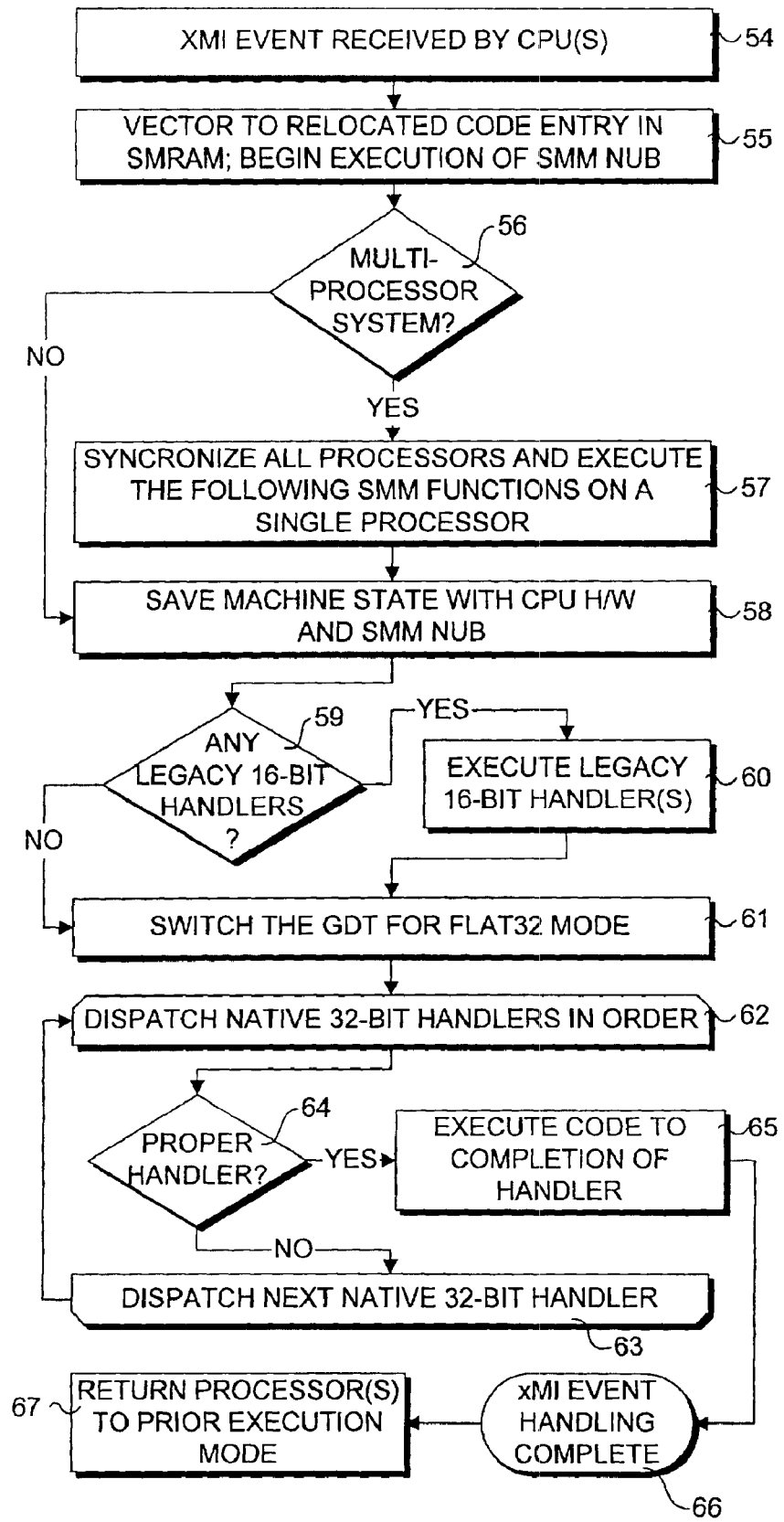
FIG. 2 is a flowchart illustrating the logic used by the present invention when handling the xMI event.

With reference to FIGS. 1 and 2, the process for handling an xMI event with an IA32 processor proceeds as follows: In a block 54, an xMI event signal 48 is received by a CPU 50. In an IA32 multiprocessor environment, the xMI event signal is received by each of the processors. In general, for IA32 processors, an xMI (SMI) event may be generated in response to activation of a pin on the system chipset, bus cycle type, or inter-processor interrupt (IPI) that cause an IA32 processor to enter SMM. For Itanium™ processors, an xMI (PMI) event may be generated in response to activation of a pin on the system chipset, bus cycle type, or an IPI that causes an Itanium™ processor to return to Physical Mode and execute code registered with the PAL (Processor Abstraction layer) for servicing PMI events.

In response to the xMI event, CPU 50 switches to SMM mode and redirects the instruction pointer to the first instruction in SMM Nub 24, wherein the SMM Nub begins executing, as provided by a block 55. In a decision block 56, a determination is made to whether the system is a multi-processor system. If the answer is yes, all of the processors are synchronized in a block 57, whereby all but a selected processor (e.g., the first processor that is identified during the pre-boot process) are halted while the SMM Nub in the selected processor is executed. The machine state of each CPU is then saved by both the CPU hardware and the SMM Nub 24 in a block 58.

Next, in a decision block 59, a determination is made to whether there are any legacy 16-bit handlers that have been registered and loaded. If there are, the code corresponding to those legacy handlers is executed in a block 60. The machine execution mode is then switched to a Flat 32 protected mode in a block 61. The protected mode comprises a flat 32-bit mode with non-paged 32-bit, zero-based addressing.

Once the execution mode switch has been completed, native 32-bit handlers are dispatched in order until an appropriate event handler is executed to completion to service the xMI event, as provided by start loop and end loop blocks 62 and 63 in FIG. 2 and a block 52 in FIG. 1. In one embodiment, the event handlers are stored as a linked list that is traversed in order from top to bottom, wherein a first event handler is dispatched and additional event handlers are dispatched as needed. Each event handler contains a first portion of code that is used to determine if that handler is the proper handler for servicing the xMI event, as provided by a decision block 64. A typical determination of this sort comprises interrogating the hardware component, subsystem, etc. corresponding to the event handler to see if an error has occurred for that object. If an error has occurred, the event handler is executed to completion in a block 65, whereupon it returns a code to the SMM Nub indicating that it has serviced the xMI event in a return block 66. If the event handler determines that its corresponding device did not cause the error, it returns a code to the SMM Nub indicating such, and the SMM Nub dispatches the next event handler in the list. This process is repeated until the appropriate event handler is executed.

Upon acknowledgment of the xMI event being handled, SMM Nub restores the machine state and executes an appropriate instruction (RSM for IA32) for the processor/all processors to return the processor(s) to its/their previous processing mode in a block 67.

Figure 3:
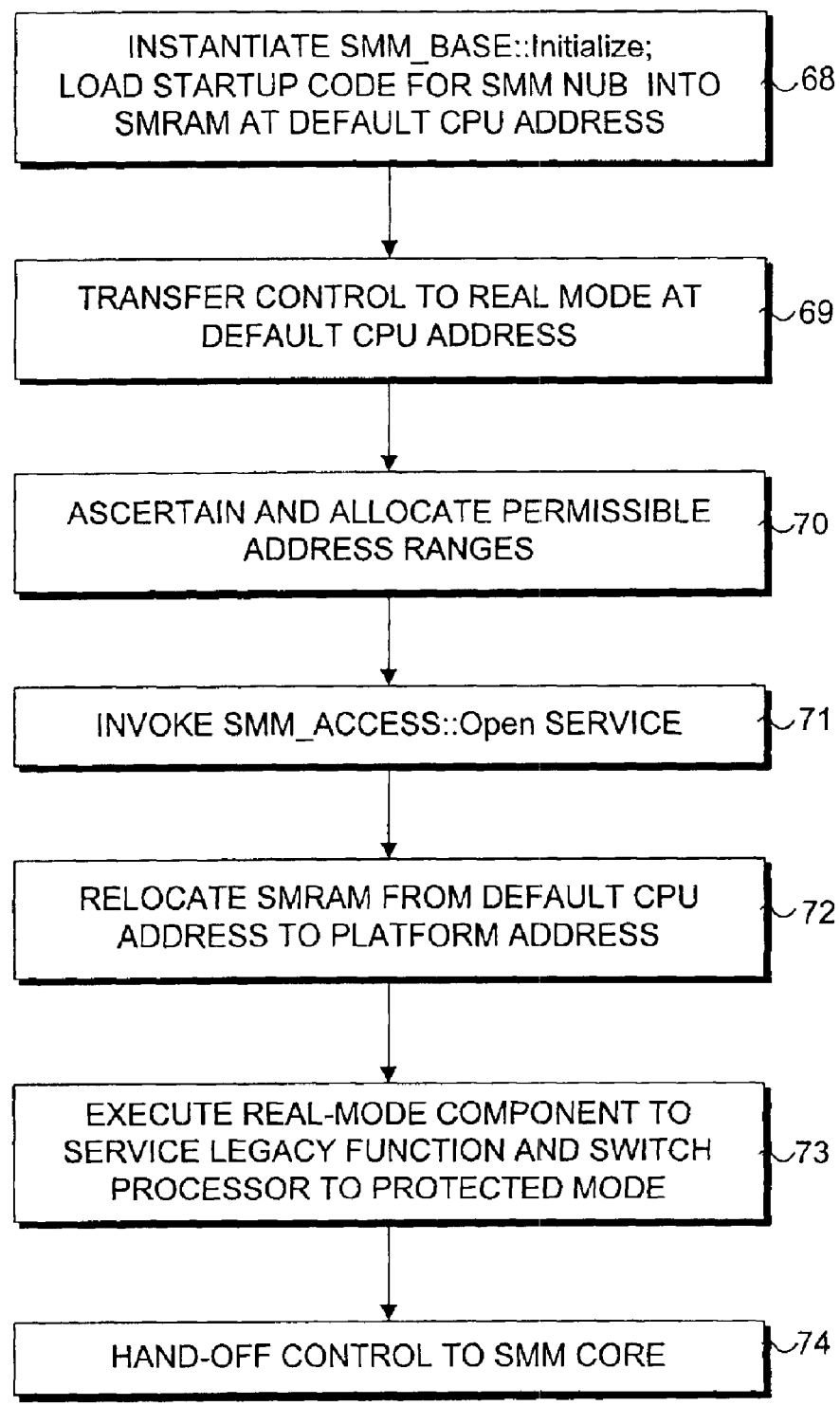
FIG. 3 is a flowchart illustrating the logic used by the present invention when loading and launching execution of an System Management Mode (SMM) Nub that is used to manage event handling when a processor is operating in SMM.

With reference to FIG. 3, the EFI SMM base protocol driver (SMM_BASE) for IA32 processors is installed through the following process. First, an SMM_BASE::Initialize service is called in a block 68. This is implemented with a DXE (Driver Execution Environment) Boot-Service driver that loads and exports this constructor.

In response to instantiating the driver, the startup code for SMM Nub 24 is loaded into SMRAM at the CPU default SMRAM address (0x3000-segment, offset 0x8000) while operating in protected mode. The processor mode is then transferred to real-mode at the execution address 0x38000p in a block 69. Next, in a block 70, the permissible address ranges for the platform's SMRAM implementation is ascertained and allocated. This information may be obtained by calling the SMM_ACCESS::GetCapabilities and SMM_ACCESS::AcquireSmramRange methods with the SMM_BASE::Initialize driver, as described below. If this driver doesn't exist, then the default policy will be 0xA000-seg for IA32 processors and runtime-data for Itanium™ processors, with a default size of (128 Kbyte for IA32 and 256 Kbyte for Itanium™).

After the address range has been allocated, the SMM_ACCESS::Open service is invoked in a block 71 and the initial address for the SMRAM is relocated from the default CPU address (0x38000p) to the platform address in a block 72. The relocated code will include a real-mode component and a protected mode component. The real-mode component will comprise the SMMEntry into the SMRAM relocation address. In a block 73, this code is executed to perform any legacy services, as necessary, and switch the processor to protected mode operation. Control is then handed off the SMM core in a block 74.

Figure 4:
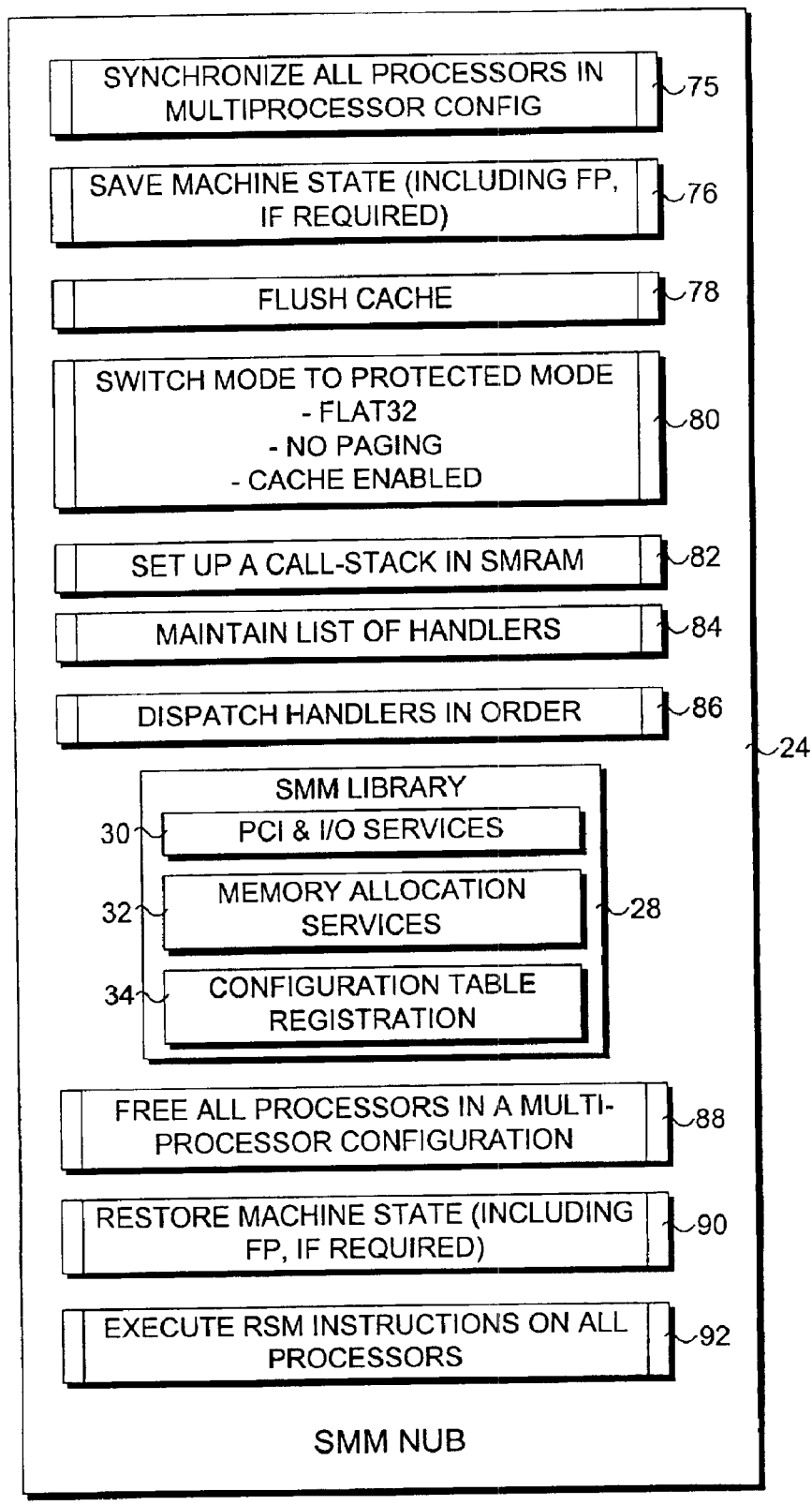
FIG. 4 is a block diagram illustrating various function and service components of the SMM Nub.

As discussed above, SMM Nub 24 is responsible for coordinating activities while the processor is operating in SMM. The various functions and services provided by SMM Nub 24 are graphically depicted in FIG. 4. These functions and services include synchronizing all of the processors for multiprocessor configurations, saving the machine state, including floating point registers, if required, and flushing the cache, as provided by function blocks 75, 76, and 78. The SMM Nub also provides a mode switching function 80 that switches the processor mode from real mode to protected mode, as discussed above with reference to block 73. Mode switching function 80 also enables the processor's internal cache. Other functions provided by SMM Nub 24 include setting up a call-stack in SMRAM 26, maintaining a list of handlers, and dispatching the handlers in order, as depicted by function blocks 82, 84, and 86.

SMM Nub 24 provides a set of services to the various event handlers through SMM library 28, including PCI and I/O services 30, memory allocation services 32, and configuration table registration services 34. In addition, SMM Nub 24 provides several functions that are performed after the xMI event is serviced. If the computer system implements a multiprocessor configuration, these processors are freed by a function 88. A function 90 restores the machine state of the processor(s), including floating point registers, if required. Finally, a function 92 is used to execute RMS instructions on all of the processors in a system.

As discussed above, the invention provides two mechanisms for loading event handlers: (1) driver-based installation; and (2) autonomous load from the firmware volumes.

For driver-based installations, the SMM_BASE protocol shall be installed by a driver that is loaded by the DXE dispatcher. After the SMM_BASE protocol is installed, it publishes an interface that enables event handlers to be registered and loaded. The protocol for registration is described by the EFI1.0 specification, which defines a mechanism for publishing new callable interfaces in the EFI environment. The SMM_BASE protocol publication essentially comprises exposing the API described in the SMM-CIS (the SMM "Component Interface Interface Specification," or EFI2.0 document describing the EFI2.0 Protocol or API set that abstracts this registration mechanism in the pre-boot space) with the EFI core. The EFI core maintains a protocol database of GUID/interface pointer pairs. The GUID comprises a 128-bit globally-unique ID of the interface.

Through this mechanism, any driver that wishes to install event handlers, wherein in one embodiment an event handler is some code that can be PE32+ binary in the IA32 or Itanium™ instruction set, or legacy 16-bit handlers for IA32, can use the standard mechanism of EFI1.0 to discover the SMM_BASE protocol instance (via the core service "LocateProtocol") or register a notification with the EFI core to be alerted when the SMM_BASE protocol is installed. In either case, once the SMM_BASE protocol is installed, various drivers can marshall the interface pointer to the SMM_BASE instance (via the EFI1.0 "HandleProtocol service") and then invoke the SMM_BASE::Register service. The binary code that the driver consuming the SMM_BASE service uses can be ascertaining from its own driver image, a file from disk or network. The file can be in the firmware volume or on the FAT disk partition.

Figure 5:
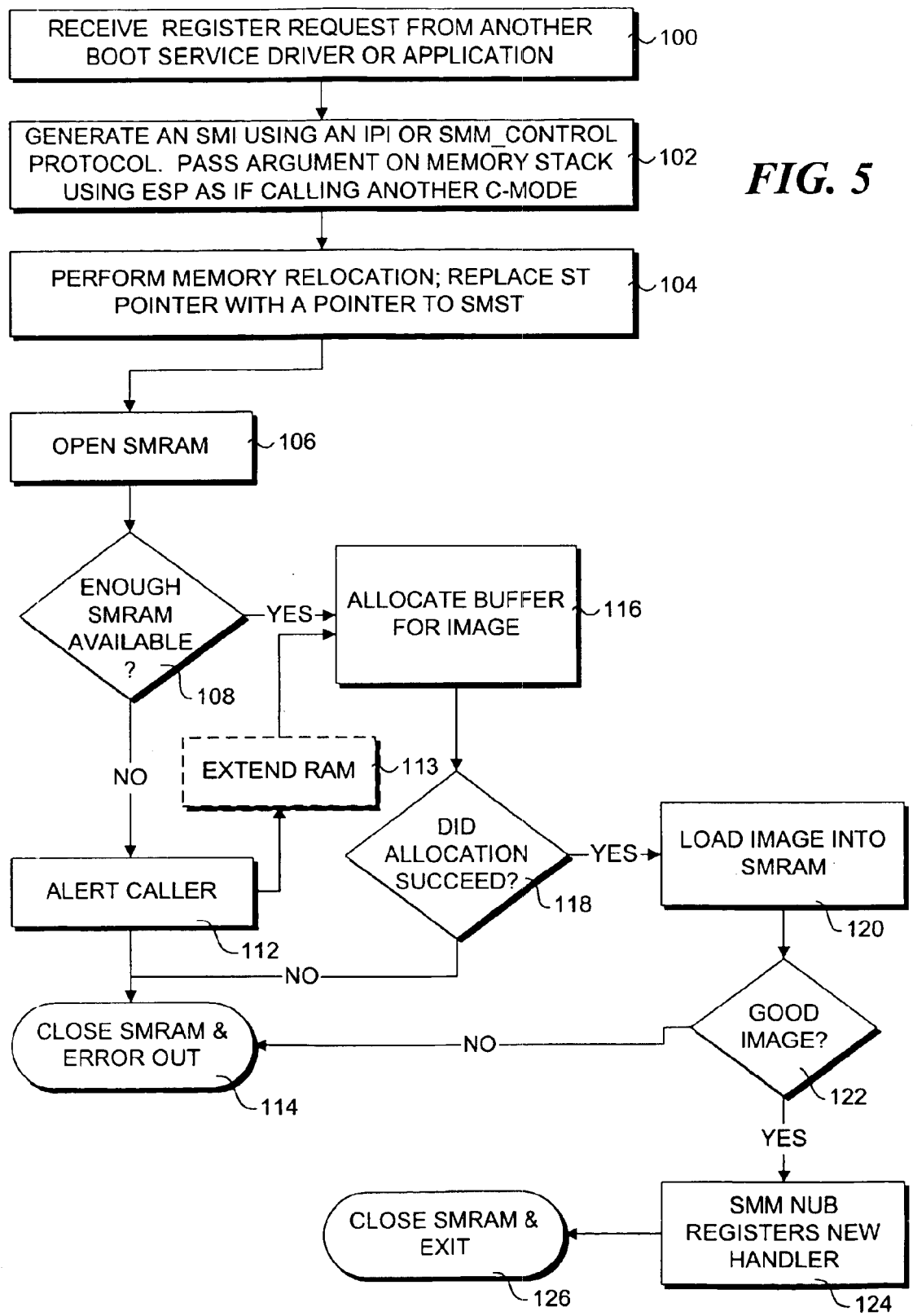
FIG. 5 is a flowchart illustrating the logic used by the invention when registering an event handler.

Registration of event handlers is further facilitated by an SMM_BASE::Register service. This service comprises a DXE Boot-Service driver that permits registration of an event handler. With reference to FIG. 5, the process for registering an event handler begins in a block 100, wherein a request to register an event handler is received by the SMM_BASE protocol driver from another boot service driver or application (i.e., drivers 1–7). In response, an SMI is generated in a block 102, using an IPI or SMM_CONTROL protocol. The argument is passed on the memory stack using the ESP memory stack pointer as if calling another handler. The handlers can be written in C and the generated image PE32+. Next, in a block 104, memory relocation is performed and the ST (System Table from EFI1.0) pointer is replaced with a pointer to the SMST (System Management System Table).

Next, the SMRAM is opened in a block 106 using the SMM_ACCESS::Open service, which is access through the SMM_ACCESS protocol. Further details of SMM_ACCESS protocol are provided in the APPENDIX that follows. The SMM_ACCESS::Open service abstracts programming of the memory controller to enable visibility of the SMRAM from non-SMRAM based code. This enables the SMM_BASE protocol to copy and install code, such as the SMM Nub, into SMRAM.

Next, in a decision block 108 a determination is made to whether enough SMRAM is available to hold the event handler routine. If not enough SMRAM memory space is available, the logic proceeds to a block 110 in which the caller is alerted. As an option, in response to being alerted, the caller may use the SMM_ACCESS::GetCapabilities and SMM_ACCESS::AcquireSmramRange method to acquire additional memory space within the SMRAM, as provided by a block 113. If there is not enough SMRAM memory space available, the SMRAM is closed by calling the SMM_ACCESS::Close method and an error code is returned to the caller in an error return block 114.

If it is determined that there is enough SMRAM memory space available, a memory buffer for the SMRAM image of the handler is allocated in a block 116. A determination to whether the allocation succeeded is made in a decision block 118. If the allocation wasn't successful, the logic proceeds to error return block 114. If the allocation is successful, an image of the event handler is loaded into the SMRAM memory space that had been previously allocated in a block 120. A determination is then made to whether the image is good in a decision block 122. If not, the logic proceeds to error return block 114. If the image is verified to be good, SMM Nub 24 registers the new event handler by adding it its list of handlers 46 in a block 124, and the SMRAM is closed and the process returns to the caller in a return block 126.

The mechanism for autonomously loading event handlers from firmware volumes does not rely on having another driver consume the SMM_BASE interface and SMM_BASE::Register service. Rather than have drivers initiate the registration process, the various firmware volumes (FV) that are materialized during the pre-boot are scanned for suitable driver files that contain event handlers that may be loaded by the SMM_BASE driver.

A firmware volume is a collection of firmware files. Each firmware file in the firmware volume has a TYPE field among other metadata in a firmware file header. Included among the enumeration of type fields within a firmware file header is a new TYPE called "SmmHandler." Understanding of the firmware volume and firmware file system ReadFile services and this new type shall be known by all drivers that implement and publish the SMM_BASE interface.

Figure 6:
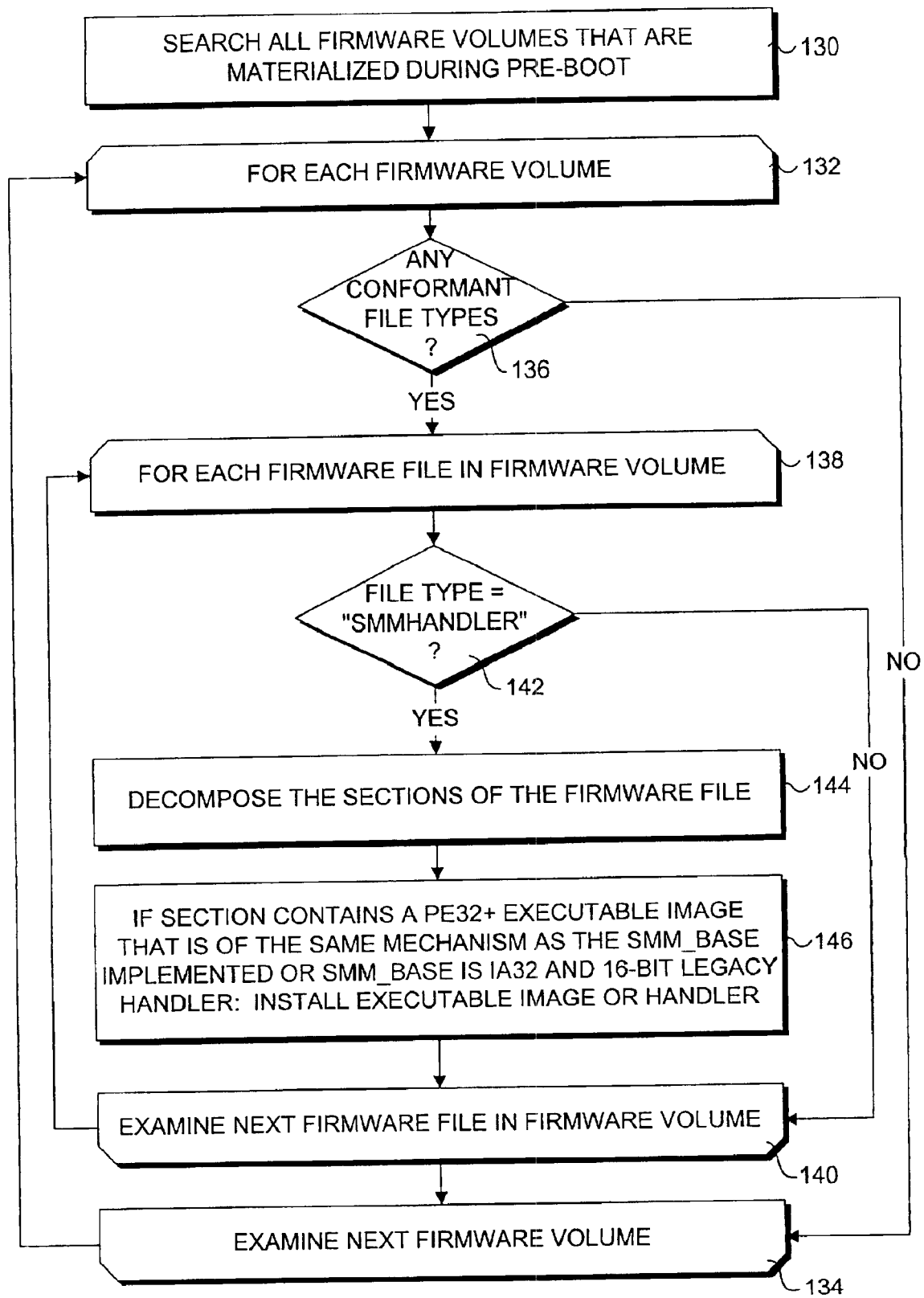
FIG. 6 is a flowchart illustrating the logic used by the invention when registering and installing event handlers that are stored in firmware volumes that are scanned during a pre-boot process.

With reference to FIG. 6, the mechanism begins in a block 130, wherein the SMM_BASE driver searches all firmware volumes that are materialized in the system during pre-boot. As defined by start and end loop blocks 132 and 134, the following logic is applied to each of these firmware volumes. In a decision block 136 a determination is made to whether the firmware volume contains any firmware files conformant with the firmware file system. If the answer is no, the logic loops back to examine the next firmware volume. If one or more conformant firmware files are found, each of these files are examined using the following process, as defined by start and end loop blocks 138 and 140. In a decision block 142, the SMM_BASE drive examines the file type of the current file to determine with it is an "SMM Handler" file, If it is not, the logic loops back to begin examination of the next file. If the file type is "SmmHandler," the SMM_BASE driver decomposes the Sections of the firmware file in a block 144; a section is the internal packing mechanism within a firmware file. As provided by a block 146, if a section contains a PE32+ executable image, wherein PE32+ is a Portable Executable image type described by Microsoft in the Portable Image specification (posted on the Internet at "www.microsoft.com/hwdev/efi") that is of the same machine type as which the SMM_BASE is implemented (e.g., the computer system is an IA32 machine and the handler is an IA32 PE32+ image) or if the SMM_BASE implementation is on an IA32 system that supports loading legacy 16-bit handlers, the SMM_BASE driver shall install the executable image or legacy 16-bit handler contained in the section. The logic then proceeds to process subsequent firmware files and firmware volumes an,a similar manner.

In general, the SMM_BASE shall assume that arguments presented above for the SMM_BASE::Register will have default values, such as floating-point save and MakeFirst==FALSE, when loading the handler autonomously from a Firmware File.

In general, the handling of an SMI with an IA-32 processor and a PMI with an Itanium-class processor encompasses similar processes. However, there are some differences. A primary difference between is that the Itanium™ processors do not have a special CPU mode entered upon activation of its xMI signal. Rather, Itanium™ processors only provide a mechanism to bind a handler into the processor to handle a PMI event. This binding is effected via a registration call into the Processor Abstraction Layer (PAL), which is firmware provided by Intel for all Itanium platform builders, and comprises part of the Itanium architecture that is used to provide a consistent firmware interface to abstract processor implementation-specific features.

Figure 7:
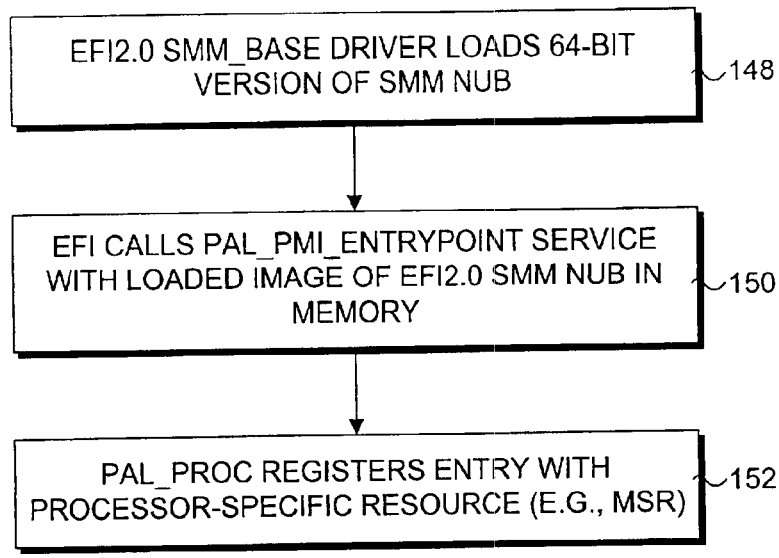
FIG. 7 is a flowchart illustrating operations performed by the invention when registering event handlers for servicing processor management interrupt (PMI) event with an Itanium™ processor.
Figure 8:
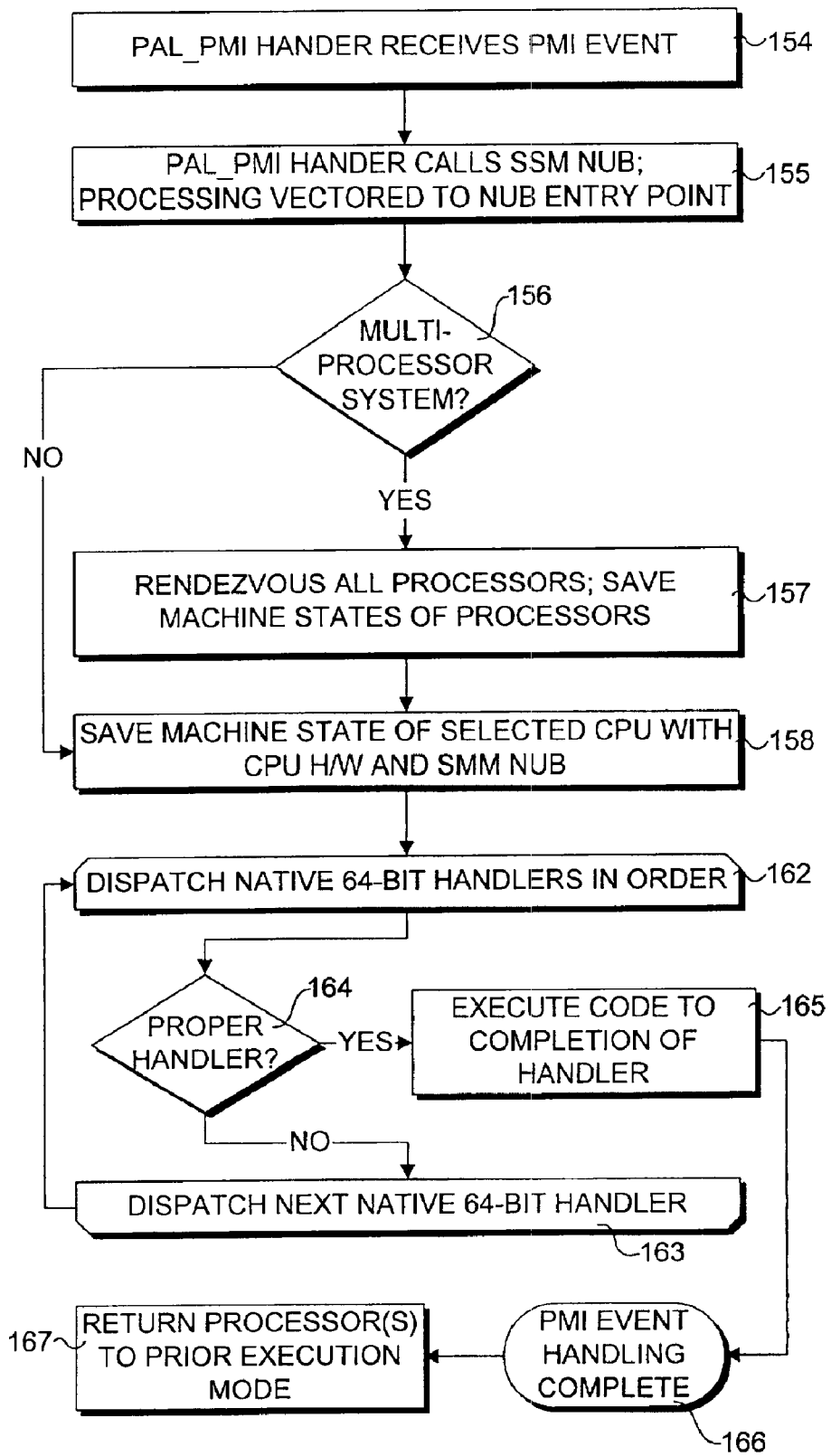
FIG. 8 is a flowchart illustrating operations performed by the invention when handler a PMI event.

Details of registering a handler and handling a PMI event with an Itanium™ processor are shown in FIGS. 7 and 8. The registration process begins in a block 148, in which the EFI2.0 SMM_BASE driver loads a 64-bit version of the SMM Nub. Upon loading the SMM Nub, the EFI calls the PAL_PMI_ENTRYPOINT service with the loaded image of the Nub in memory in a block 150, which creates an entry point into the Nub code.

During initialization, the PAL publishes a set of services called PAL_PROCS. One of these PAL_PROCS is then used to register the entrypoint with an appropriate processor-specific resource, such as the processor's model-specific registers (MSR). Registration of the entrypoint thereby creates a binding between the processor and the set of PMI event handlers that are accessed via the SMM Nub.

With reference to FIG. 8, PMI event handling may then be performed as follows. In a block 154, a PAL_PMI event handler receives a PMI event. The PAL_PMI event handler then calls SMM Nub 24 in a block 155, which causes the processing of a processor that is selected to perform extensible PMI event handling to be vectored to the Nub entry point that was registered above. In a decision block 156, a determination is made to whether the system is a multiprocessor system. If the answer is yes, all of the processors are rendezvoused in a block 157, whereby all but a selected processor (e.g., the first processor that is identified during the pre-boot process) are halted while the SMM Nub in the selected processor is executed. The machine state of each CPU is then saved by both the CPU hardware and the SMM Nub 24 in a block 158.

Once the machine state(s) of the processor(s) has/have been saved, native 64-bit handlers are dispatched in order until an appropriate event handler is executed to completion to service the PMI event, as provided by start loop and end loop blocks 162 and 163. As before, in one embodiment the event handlers are stored as a linked list that is traversed in order from top to bottom, wherein a first event handler is dispatched and additional event handlers are dispatched as needed. Each event handler contains a first portion of code that is used to determine if that handler is the proper handler for servicing the xMI event, as provided by a decision block 164, which may typically include interrogation of a corresponding hardware component in the manner discussed above. If a currently executed event handler is determined to be the appropriate handler, that event handler is executed to completion in a block 165, whereupon it returns a code to the SMM Nub indicating that it has serviced the PMI event in a return block 166. If the event handler determines that it is not the appropriate handler for the PMI event, it returns a code to the SMM Nub indicating such, and the SMM Nub dispatches the next event handler in the list. In a manner similar to that discussed above for SMI event handling, this process is repeated until the appropriate event handler is executed.

Upon acknowledgment of the PMI event being handled, SMM Nub restores the machine state and executes an appropriate instruction (RSI) for the processor/all processors to return the processor(s) to its/their previous processing mode in a block 167.

Exemplary Machine for Implementing the Invention

Figure 9:
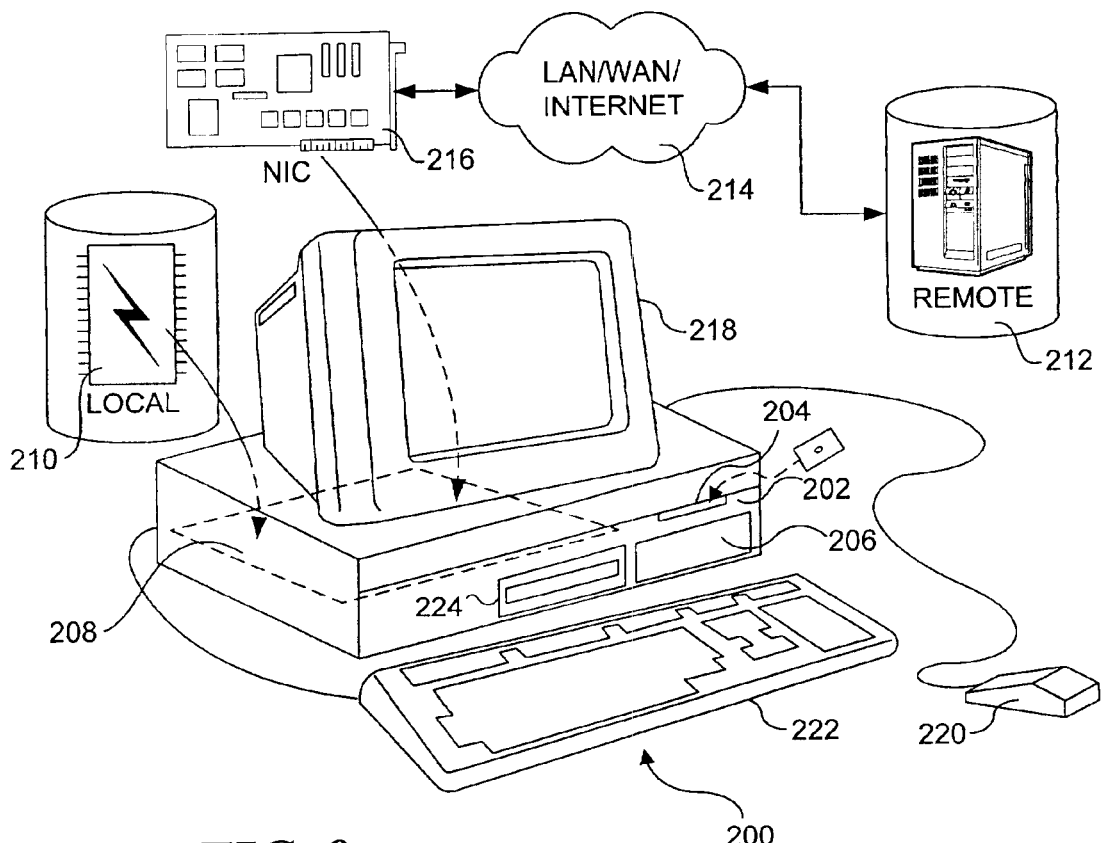
FIG. 9 is a schematic diagram of a person computer system suitable for implementing the present invention.

With reference to FIG. 9, a generally conventional personal computer 200 is illustrated, which is suitable for use in connection with practicing the present invention. The distributed platform firmware architecture of the invention may also be implemented on workstations, laptops, and computer servers in a similar manner. Personal computer 200 includes a processor chassis 202 in which are mounted a floppy disk drive 204, a hard drive 206, a motherboard 208 populated with appropriate integrated circuits including one or more microprocessors and memory modules (both not shown), and a power supply (also not shown), as are generally well known to those of ordinary skill in the art. Motherboard 208 also includes a local firmware storage device 210 (e.g., flash EEPROM) on which the base portion of the BIOS firmware is stored. To facilitate access to the portion of the BIOS firmware that is retrieved from a remote firmware storage device 212 via a network 214, personal computer 200 includes a network interface card 216 or equivalent circuitry built into motherboard 208. Network 214 may comprise a LAN, WAN, and/or the Internet, and may provide a wired or wireless connection between personal computer 200 and remote firmware storage device 212.

A monitor 218 is included for displaying graphics and text generated by software programs that are run by the personal computer and which may generally be displayed during the POST test and other aspect of firmware load/execution. A mouse 220 (or other pointing device) is connected to a serial port (or to a bus port) on the rear of processor chassis 202, and signals from mouse 220 are conveyed to motherboard 108 to control a cursor on the display and to select text, menu options, and graphic components displayed on monitor 218 by software programs executing on the personal computer. In addition, a keyboard 222 is coupled to the motherboard for user entry of text and commands that affect the running of software programs executing on the personal computer.

Personal computer 200 also optionally includes a compact disk-read only memory (CD-ROM) drive 224 into which a CD-ROM disk may be inserted so that executable files and data on the disk can be read for transfer into the memory and/or into storage on hard drive 206 of personal computer 200. If the base BIOS firmware is stored on a rewriteable device, such as a flash EEPROM, machine instructions for updating the base portion of the BIOS firmware may be stored on a CD-ROM disk or a floppy disk and read and processed by the computer's processor to rewrite the BIOS firmware stored on the flash EEPROM. Updateable BIOS firmware may also be loaded via network 214.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

Appendix

SMM_ACCESS Protocol for IA32

The SMM_ACCESS protocol is published by a chipset driver, namely the MCH driver for the 82815 chipset. This driver abstracts the capabilities of the memory controller for opening, closing, and locking SMRAM. It also describes the possible regions for the SMRAM, including the location of the legacy frame buffer at 0xA0000, and memory near the top of the physical DRAM (T-SEG).

The SMM_ACCESS protocol constructor should register a call-back on ExitBootServices. The SMM_ACCESS protocol provides the following functions:

SMM_ACCESS::Open

This service abstracts programming of the memory controller to enable visibility of the SMRAM from non-SMRAM based code. This enables the SMM_BASE protocol to copy and install code, such as the SMM Nub, into SMRAM.

SMM_ACCESS::Close

This service abstracts programming of the memory controller to disable the visibility of the SMRAM from non-SMRAM based code. This enables the SMM_BASE protocol to inhibit other pre-boot agents from viewing the SMRAM-based contents.

SMM_ACCESS::Lock

This service abstracts the hardware capability of securing the SMRAM such that no future attempts can succeed in opening the visibility of this region.

SMM_ACCESS::GetCapabilities

This call provides the caller, which is most likely the SMM_BASE driver, the available regions of memory for use as SMRAM. This is a read-only reporting service that publishes information. The claiming of the region and programming of the chipset to effect the decode of this store in SMRAM is effected by acquiring the region in question (see next service).

SMM_ACCESS::AcquireSmramRange

This service provides two types of functionality. The first is that it is the resource management database visible to the EFI2.0 boot-service caller. The possible ranges of available SMRAM in the platform are published by the GetCapabilities' service SMRAM Map, and a region is the map can be requested for enable by this service. This request minimally includes an update to the driver of ownership, but the call will also entail chipset programming that actually enables the request regime.

SMM_ACCESS::ReleaseSmramRange

This service provides two types of functionality. This request minimally includes an update to the driver of releasing ownership of a range, but the call will also entail chipset programming that actually disables the request regime.

What is claimed is:

1. A method for extending a hidden execution and storage mode of a processor in a computer system, comprising:

providing a mechanism to enable loading of a first event handler that is stored in an original set of firmware as supplied by an original equipment manufacture (OEM) of the computer system into a hidden memory space that is accessible to the hidden execution and storage mode but is not accessible to other operating modes of the processor;

providing a mechanism to enable a loading of a second event handler that is not stored in the original set of firmware as supplied by an original equipment manufacture (OEM) of the computer system into the hidden memory space; and enabling selective execution the first and second event handlers in response to an event that causes the processor to be switched to the hidden execution and storage mode to service the event.

2. The method of claim 1, wherein the hidden execution and storage mode comprises a System Management Mode (SMM) of a microprocessor.

3. The method of claim 1, wherein the mechanism for enabling loading and execution of the second event handler comprises:

providing an abstracted interface that enables a set of machine code corresponding to an event handler that is stored outside of any component(s) in which the original set of firmware is stored to be loaded into the hidden memory space;

redirecting an instruction pointer for the processor to execute the set of machine code to service the event while the processor is operating in the hidden execution and storage mode.

4. The method of claim 3, wherein the abstracted interface is published during a pre-boot process for the computer system to enable a driver to load the set of machine code corresponding to the second event handler prior to loading an operating system for the computer system.

5. The method of claim 1, wherein the mechanism for enabling loading of the second event handler comprises:

scanning for any firmware volumes that are materialized during a pre-boot process for the computer system to identify an existence of any firmware file containing an event handler that is compatible with the hidden execution and storage mode of the processor;

loading the event handler into the hidden memory space;

redirecting an instruction pointer for the processor to execute the event handler to service the event while the processor is operating in the hidden execution and storage mode.

6. The method of claim 1, further comprising:

loading an event handler management service into the hidden memory storage space;

registering one or more event handlers with the event handling management service;

loading said one or more event handlers into the hidden memory space;

redirecting an instruction pointer for the processor to begin execution of the event handler management service is response to the event that causes the processor to be switched to the hidden execution and storage mode; and dispatching an event handier via the event handler management service to service the event.

7. The method of claim 6, wherein a plurality of event handlers are registered with the event handling management service and loaded into the hidden memory space, further comprising:

creating an ordered list of said plurality of event handlers;

dispatching a first event handler;

determining if the first event handler is an appropriate event handler for servicing the event and, if it is, executing the first event handler to completion to service the event; otherwise dispatching a next event handler in the list and determining whether that event handler is an appropriate event handler and repeating this function until the appropriate event handler has been dispatched, whereupon that event handler is executed to completion to service the event.

8. The method of claim 7, wherein each of said plurality of event handlers comprise a set a machine code that is executed by the processor to service an error condition generated by a hardware component in the computer system that causes the event, and determining whether an event handler is the appropriate event handler for servicing the event comprises:

executing a first portion of the set of machine code corresponding to the event handler that was most recently dispatched that queries the hardware component corresponding to that event handler to determine if the error condition was caused by that hardware component; and completing execution of the set of machine code for the event handler if it is determined that the error condition was cause by its corresponding hardware component, otherwise returning a value to the event handler management service indicating that the event handler is not the appropriate event handler to service the error condition.

9. The method of claim 6, further comprising authenticating the event handler before it is loaded into the hidden memory space.

10. The method of claim 6, wherein the original set of firmware includes one or more legacy event handlers including the first event handler, further comprising:

registering said one or more legacy event handlers with the event handling management service;

loading said one or more legacy event handlers into the hidden memory space accessible to the hidden execution and storage mode; and dispatching at least one of said one or more legacy event handlers via the event handler management service to service the event.

11. The method of claim 6, wherein the computer system includes a plurality of processors, further comprising:

loading the service handler management service into a selected processor among said plurality of processors;

causing the selected processor to begin execution of the service handler management service in response to the event;

synchronizing all of said plurality of processors other than the selected processor and halting execution of a respective current operation for each of these other processors during execution of the service handler management service;

returning all of said plurality of processors to a previous processing mode to resume execution of their respective operations after the event has been serviced by an appropriate event handler.

12. The method of claim 1, further comprising enabling any legacy event handlers that are stored as machine code in the original set of firmware to be executed to service the event, as appropriate, in response to the event.

13. A method for extending a System Management Mode (SMM) of a microprocessor in a computer system, comprising:

publishing an interface during a pre-boot process for the computer system to enable a driver that is stored outside of components in which the original set of firmware is stored to provide a set of machine code comprising an event handler that is loaded into SMM memory (SMRAM) that is accessible to the microprocessor while in SMM;

switching the microprocessor to SMM in response to an SMM triggering event; and executing the event handler to service the SMM triggering event.

14. The method of claim 13, further comprising:

loading an event handler management service into SMRAM;

registering one or more event handlers with the event handling management service;

loading said one or more event handlers into SMRAM;

redirecting an instruction pointer for the microprocessor to begin execution of the event handler management service in response to the SMM triggering event; and dispatching an event handler via the event handler management service to service the event.

15. The method of claim 14, wherein a plurality of event handlers are registered with the event handling management service and loaded into SMRAM, further comprising:

creating an ordered list of said plurality of event handlers;

dispatching a first event handler;

determining if the first event handler is an appropriate event handler for servicing the SMM triggering event and, if it is, executing the first event handler to completion to service the event; otherwise dispatching a next event handler in the list and determining whether that event handler is an appropriate event handler for servicing the SMM triggering event and repeating this function until the appropriate event handler has been dispatched, whereupon that event handler is executed to completion to service the SMM triggering event.

16. The method of claim 14, further comprising authenticating the event handler before it is loaded into SMRAM.

17. The method of claim 14, wherein the original set of firmware includes one or more legacy event handlers, further comprising:

registering said one or more legacy event handlers with the event handling management service;

loading said one or more legacy event handlers into SMRAM; and dispatching at least one of said one or more legacy event handlers via the event handler management service to service a legacy event corresponding to the SMM triggering event.

18. The method of claim 13, further comprising:

scanning for any firmware volumes that are materialized during the pre-boot process for the computer system to identify an existence of any firmware file containing an event handler that is compatible with the SMM mode of the microprocessor;

loading the event handler into SMRAM; and executing the event handler to service the SMM triggering event.

19. A machine-readable medium having a plurality of machine instructions stored thereon that when executed by a processor in a computer system performs the operations of:

providing a mechanism to enable a loading of a plurality of event handlers that are not stored in an original set of firmware as supplied by an original equipment manufacture (OEM) of the computer system into a hidden memory space that is accessible to a hidden execution and storage mode of the processor but is not accessible to other operating modes of the processor, the mechanism enabling event handlers from at least two different third party sources to be loaded into the hidden memory space; and selectively executing the an appropriate event handler from among the plurality of event handlers in response to an event that causes the processor to be switched to the hidden execution and storage mode to service the event.

20. The machine-readable medium of claim 19, wherein the mechanism for enabling loading and execution of the plurality event handlers comprises:

providing an abstracted interface that enables a set of machine code corresponding to an event handler that is stored outside of any component(s) in which the original set of firmware is stored to be loaded into the hidden memory space;

redirecting an instruction pointer for the processor to execute the set of machine code to service the event while the processor is operating in the hidden execution and storage mode.

21. The machine-readable medium of claim 19, wherein the mechanism for enabling loading and execution of the plurality of event handlers comprises:

scanning for any firmware volumes that are materialized during a pre-boot process for the computer system to identify an existence of any firmware file containing an event handler that is compatible with the hidden execution and storage mode of the processor;

loading the event handler into the hidden memory space;

redirecting an instruction pointer for the processor to execute the event handler to service the event while the processor is operating in the hidden execution and storage mode.

22. The machine-readable medium of claim 19, wherein execution of said plurality of machine instructions further performs the operations of:

loading an event handler management service into the hidden memory space;

registering one or more event handlers with the event handling management service;

loading said one or more event handlers into the hidden memory space;

redirecting an instruction pointer for the processor to begin execution of the event handler management service is response to the event that causes the processor to be switched to the hidden execution and storage mode; and dispatching an event handler via the event handler management service to service the event.

23. The machine-readable medium of claim 22, wherein a plurality of event handlers are registered with the event handling management service and loaded into the hidden memory space, and execution of said plurality of machine instructions further performs the operations of:

creating an ordered list of said plurality of event handlers;

dispatching a first event handler;

determining if the first event handler is an appropriate event handler for servicing the event and, if it is, executing the first event handler to completion to service the event; otherwise dispatching a next event handler in the list and determining whether that event handler is an appropriate event handler and repeating this function until the appropriate event handler has been dispatched, whereupon that event handler is executed to completion to service the event.

24. A computer system comprising:

a motherboard on which an original set of firmware is stored; a memory operatively coupled to the motherboard in which a plurality of machine instructions are stored; and a processor linked in communication with the memory, for executing the machine instructions to perform the operations of:

loading a first event handler that is stored in an original set of firmware as supplied by an original equipment manufacture (OEM) of the computer system into a hidden memory space that is accessible to the hidden execution and storage mode but is not accessible to other operating modes of the processor;

loading a second event handler that is not stored in the original set of firmware as supplied by an original equipment manufacture (OEM) of the computer system into the hidden memory space ; and enabling selective execution of the first and second event handlers in response to an event that causes the processor to be switched to the hidden execution and storage mode to service the event.

25. The computer system of claim 24, wherein loading and execution of the second event handler comprises:

providing an abstracted interface that enables a set of machine code corresponding to an event handler that is stored outside of any component(s) in which the original set of firmware is stored to be loaded into the hidden memory space;

redirecting an instruction pointer for the processor to execute the set of machine code to service the event while the processor is operating in the hidden execution and storage mode.

26. The computer system of claim 24, wherein loading and execution of the second event handler comprises:

scanning for any firmware volumes that are materialized during a pre-boot process for the computer system to identify an existence of any firmware file containing an event handler that is compatible with the hidden execution and storage mode of the processor;

loading the second event handler into the hidden memory space;

redirecting an instruction pointer for the processor to execute the second event handler to service the event while the processor is operating in the hidden execution and storage mode.

* * * * *

UNITED STATES PATENT AND TRADEMARK OFFICE
CERTIFICATE OF CORRECTION

PATENT NO. : 6,848,046 B2
DATED : January 25, 2005
INVENTOR(S) : Zimmer

It is certified that error appears in the above-identified patent and that said Letters Patent is hereby corrected as shown below:

<u>Column 8,</u>
Line 57, delete "an," and insert -- in --.

<u>Column 14,</u>
Line 58, delete "the".
Line 65, insert -- of --.

Signed and Sealed this

Tenth Day of May, 2005

JON W. DUDAS
*Director of the United States Patent and Trademark Office*